(12) United States Patent
Rutberg

(10) Patent No.: US 11,694,323 B2
(45) Date of Patent: Jul. 4, 2023

(54) IMAGE-BASED SENSOR FOR MEASURING ROTATIONAL POSITION OF A ROTATING SHAFT

(71) Applicant: CAMX Power LLC, Lexington, MA (US)

(72) Inventor: Michael Rutberg, Arlington, MA (US)

(73) Assignee: CAMX Power LLC, Lexington, MA (US)

( * ) Notice: Subject to any disclaimer, the term of this patent is extended or adjusted under 35 U.S.C. 154(b) by 0 days.

(21) Appl. No.: 17/183,068

(22) Filed: Feb. 23, 2021

(65) Prior Publication Data

US 2022/0076403 A1  Mar. 10, 2022

Related U.S. Application Data

(60) Provisional application No. 63/014,236, filed on Apr. 23, 2020.

(51) Int. Cl.
*G06T 7/00* (2017.01)
*G06T 7/70* (2017.01)
(Continued)

(52) U.S. Cl.
CPC .......... *G06T 7/0004* (2013.01); *G06T 1/0007* (2013.01); *G06T 7/40* (2013.01);
(Continued)

(58) Field of Classification Search
CPC ....... G06T 7/0004; G06T 1/0007; G06T 7/40; G06T 7/70; G06T 2207/30164; H04N 5/2256
See application file for complete search history.

(56) References Cited

U.S. PATENT DOCUMENTS 5,508,609 A * 4/1996 Parkinson ................ G01B 7/31
340/870.3
2002/0002877 A1   1/2002 Torre
(Continued)

FOREIGN PATENT DOCUMENTS

CN        102645161 A  *  8/2012
EP          2372314 A2  * 10/2011 ............. G01D 5/285
(Continued)

OTHER PUBLICATIONS

Verkroost, F.C. "NonContact Optoelectronic Instruments for the Measurement of Rotational Movement", A thesis submitted to the Victoria University of Manchester, Oct. 1978 (Year: 1978).*
(Continued)

*Primary Examiner* — Richard A Hansell, Jr.
(74) *Attorney, Agent, or Firm* — Dinsmore & Shohl LLP

(57) ABSTRACT

Non-contact sensors include an image sensor configured to capture image data of a portion of a surface of a rotatable shaft and an electronic control unit communicatively coupled to the image sensor. The electronic control unit is configured to receive image data having a plurality of frames from the image sensor and store the image data in a memory component of the electronic control unit, determine a transformation in image space between one or more surface features that appear in a first frame of the image data and the same one or more surface features that appear in a second frame of the image data, determine a rotational position of the rotatable shaft at a time of capture of the second frame of the image data based on the transformation and a quantitatively characterized relationship between image space and object space, and store the rotational position of the rotatable shaft.

18 Claims, 4 Drawing Sheets

(51) Int. Cl.
*G06T 1/00* (2006.01)
*G06T 7/40* (2017.01)
*H04N 23/56* (2023.01)

(52) U.S. Cl.
CPC .............. *G06T 7/70* (2017.01); *H04N 23/56* (2023.01); *G06T 2207/30164* (2013.01)

(56) References Cited

U.S. PATENT DOCUMENTS

| | | | | |
|---|---|---|---|---|
| 2013/0015338 A1* | 1/2013 | Masa | ..................... | G01D 5/285 250/231.13 |
| 2016/0099388 A1* | 4/2016 | Jung | ....................... | H01L 33/54 438/16 |
| 2018/0158183 A1* | 6/2018 | Kobayashi | ............. | G01N 21/84 |
| 2018/0306832 A1 | 10/2018 | Liu | | |
| 2019/0041420 A1* | 2/2019 | Zhong | .................. | G06V 10/245 |
| 2019/0162611 A1* | 5/2019 | Zerwekh | .................. | G01P 3/36 |
| 2019/0166317 A1* | 5/2019 | Tanaka | ............. | H01L 27/14621 |
| 2019/0306443 A1* | 10/2019 | Ohno | ..................... | H04N 25/79 |
| 2020/0169653 A1* | 5/2020 | Jones | .................. | G02B 26/008 |
| 2021/0063897 A1* | 3/2021 | Gladnick | ............... | H05B 45/32 |
| 2021/0148771 A1* | 5/2021 | Spoor | ....................... | G01P 3/38 |

FOREIGN PATENT DOCUMENTS

| | | |
|---|---|---|
| JP | 2007139756 A | 6/2007 |
| JP | 2015010912 A | 1/2015 |
| KR | 102032156 B1 | 10/2019 |

OTHER PUBLICATIONS

International Searching Authority, Notification of Transmittal of the International Search Report and the Written Opinion of the International Searching Authority, or the Declaration; dated Aug. 17, 2021, 10 pgs.

* cited by examiner

IMAGE-BASED SENSOR FOR MEASURING ROTATIONAL POSITION OF A ROTATING SHAFT

CROSS-REFERENCE TO RELATED APPLICATIONS

This application claims the benefit of U.S. Provisional Application No. 63/014,236 entitled "IMAGE-BASED SENSOR FOR MEASURING ROTATIONAL POSITION OF A ROTATING SHAFT," filed on Apr. 23, 2020, the entirety of which is hereby incorporated by reference.

STATEMENT OF GOVERNMENT SPONSORSHIP

Portions of this invention were made with government support under contract no. N68335-16-C-0495, awarded by the Department of the Navy. The government has certain rights in the invention.

TECHNICAL FIELD

The present specification generally relates to rotating machinery, and more specifically, to non-contact sensor systems for determining rotational position and/or measuring speed and torque on the rotating machinery.

BACKGROUND

Precise measurement of the instantaneous rotational position of a rotating shaft is a fundamental sensing capability. A shaft rotational position data stream can be numerically differentiated to obtain a measurement of instantaneous shaft rotational speed. Rotational position data streams from two axially separated points on a rotating shaft under torque can be used to calculate instantaneous torsional shaft deflection. If the quantitative relationship between torque and torsional deflection of the shaft is characterized, the torsional shaft deflection can be used to calculate instantaneous torque on the shaft.

Measurement of instantaneous shaft rotational position, rotational speed, and torque in rotating machinery has applications including but not limited to: component usage tracking and anomaly detection for condition-based maintenance; event diagnostics; synchronized automation; feedback for real-time control; and characterization of system dynamics.

There are various established and experimental sensing technologies for measuring shaft rotational position, rotational speed, and/or torque. These include magnetic and optical encoders, resolvers, Hall Effect sensors, strain gauges, variable reluctance sensors, eddy current sensors, magnetostrictive sensors, and surface acoustic wave sensors. However, all of these technologies require components to be installed on the rotating body itself, and/or require restrictions on the materials and/or design of the rotating shaft.

The requirements and restrictions imposed by existing technologies are not practical for some applications. An example of such an application is a pre-existing aircraft drive shaft, for which any modifications to the rotating body would necessitate costly process changes and requalification testing. Accordingly, there is a need for a non-contact sensor capable of measuring the instantaneous rotational position and further capable of determining a rotational speed and a torque of unmodified rotatable shafts independent of the materials forming the rotatable shafts.

SUMMARY

The following summary is provided to facilitate an understanding of some of the innovative features unique to the present disclosure and is not intended to be a full description. A full appreciation of the various aspects of the disclosure can be gained by taking the entire specification, claims, drawings and abstract as a whole.

In a first aspect, a non-contact sensor includes an image sensor configured to capture image data of a portion of a surface of a rotatable shaft and an electronic control unit communicatively coupled to the image sensor. The electronic control unit configured to receive image data from the image sensor and store the image data in a memory component of the electronic control unit, the image data comprising a plurality of image frames, determine a transformation in image space between one or more surface features that appear in a first frame of the image data and the same one or more surface features that appear in a second frame of the image data, determine a rotational position of the rotatable shaft at a time of capture of the second frame of the image data based on the transformation and a quantitatively characterized relationship between image space and object space, and store the rotational position of the rotatable shaft at the time of capture of the second frame of the image data in the memory component of the electronic control unit.

In some aspects, a method includes receiving image data from an image sensor and storing the image data in a memory component of an electronic control unit, the image data comprising a plurality of image frames, determining a transformation in image space between one or more surface features that appear in a first frame of the image data and the same one or more surface features that appear in a second frame of the image data, determining a rotational position of a rotatable shaft at a time of capture of the second frame of the image data based on the transformation and a quantitatively characterized relationship between image space and object space, and storing the rotational position of the rotatable shaft at the time of capture of the second frame of the image data in the memory component of the electronic control unit.

In some aspects, a system includes a first non-contact sensor and a second non-contact sensor communicatively coupled to a computing device. The first non-contact sensor includes a first image sensor configured to capture image data of a first portion of a surface of a rotatable shaft and the second non-contact sensor includes a second image sensor configured to capture image data of a second portion of a surface of the rotatable shaft, wherein the first portion and the second portion are axially separated along the rotatable shaft. The computing device is configured to receive a first image data from the first image sensor and a second image data from the second image sensor, the first and second image data each comprising a plurality of image frames. The computing device is further configured to determine a first transformation in image space between one or more surface features that appear in a first frame of the first image data and the same one or more surface features that appear in a second frame of the first image data, determine a first rotational position of the rotatable shaft at a time of capture of the second frame of the first image data based on the first transformation and a first quantitatively characterized relationship between image space of the first image sensor and object space, determine a second transformation in image space between one or more surface features that appear in a first frame of the second image data and the same one or more surface features that appear in a second frame of the second image data, determine a second rotational position of the rotatable shaft at a time of capture of the second frame of the second image data based on the second transformation and a second quantitatively characterized relationship between image space of the first image sensor and object space, calculate an angular difference between the first rotational position and the second rotational position of the rotatable shaft, thereby determining a torsional deflection of the rotatable shaft between the first portion and the second portion of the rotatable shaft, and store the torsional deflection of the rotatable shaft in a memory component of the computing device.

These and additional object and advantages provided by the aspects described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The devices, systems, and methods described herein generally relate to non-contact sensors for measuring the rotational position of a rotatable shaft optionally including an illuminating device that illuminates an area on the surface of the rotatable shaft, such that the light from the illuminating device is obliquely incident on the surface of the rotatable shaft. An image sensor and associated imaging optics are positioned to form an optical path such that the image sensor's field of view includes a portion of the surface of the rotatable shaft, optionally, within the illuminated area. An electronic control unit is communicatively coupled to the image sensor such that the electronic control unit receives and stores image data comprising a plurality of image frames from the image sensor. The electronic control unit implements one or more signal and/or image processing algorithms to track surface features on the surface of the rotatable shaft across multiple image frames. The electronic control unit calculates and outputs and/or stores, in a memory component, a rotational position of a rotatable shaft based on a transformation in image space between one or more surface features that appear in a first frame of the image data and the same one or more surface features that appear in a second frame of the image data and a quantitatively characterized relationship between image space and object space, as described herein. The surface features used for determining a rotational position of the rotatable shaft are naturally occurring, incidentally created, or intentionally created. For example, but without limitation, the surface features may be machining marks, imperfections in paint or other surface finish, striations, flow lines, discolorations, or the like which may have resulted from the manufacture and/or use of the rotatable shaft.

The following will now describe the non-contact sensors for measuring the rotational position of a rotatable shaft in more detail.

Figure 1:
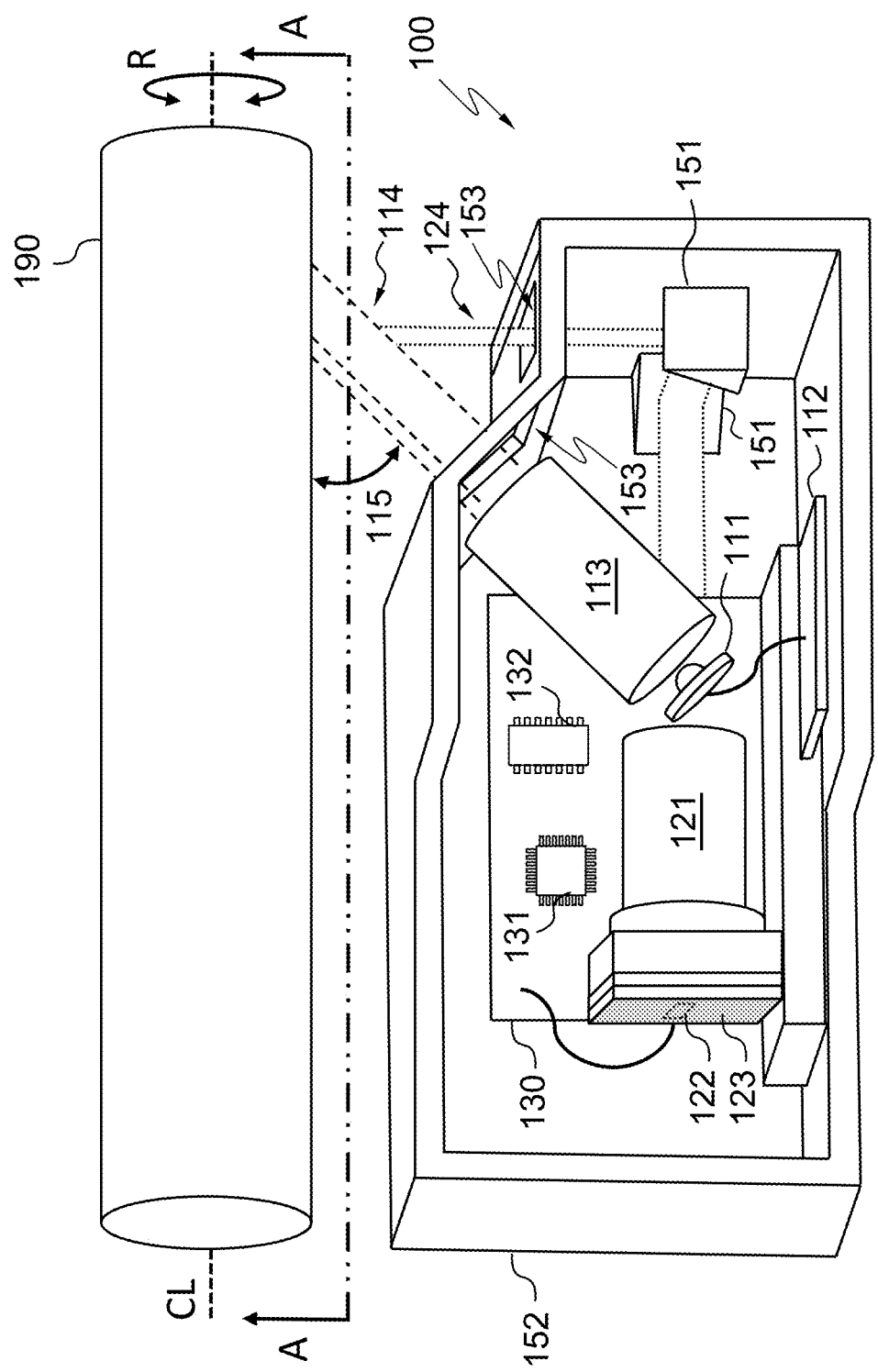
FIG. 1 depicts an illustrative schematic view of a non-contact sensor for measuring rotational position of a rotatable shaft, according to one or more embodiments shown and described herein.

Turning now to the drawings where like numbers refer to like structures, and particularly to FIG. 1, an illustrative non-contact sensor 100 for determining a rotational shaft position according to one embodiment is shown. In the illustrated non-limiting embodiment, the non-contact sensor 100 includes an illuminating device 111 driven by an illuminator drive circuit 112 and focused by illuminator optics 113 along an optical path 114 onto a surface of the rotatable shaft 190, impinging at an oblique angle of incidence 115 relative to a plane tangent to the surface at the point of impingement. As a non-limiting example, the angle of incidence 115 may be between 35° and 55°. In some embodiments, the angle of incidence may be greater than 0° and less than 90°. In some embodiments, the angle of incidence may be about 5°, about 10°, about 15°, about 20°, about 25°, about 30°, about 35°, about 40°, about 45°, about 50°, about 55°, about 60°, about 65°, about 70°, about 75°, about 80°, about 85° or any angle between 1° and 89°.

The illuminating device 111 comprises one or more light emitting devices, including but not limited to monochrome or white light LEDs or LED arrays, diode lasers, fiber lasers, and incandescent lamps. The illuminator optics 113 comprise one or more optical elements, which direct light from the illuminating device 111 to the surface of a rotatable shaft 190, including but not limited to aspheric refractive lens elements, bi-convex or plano-convex spherical refractive lens elements, other lenses, prisms, mirrors, optical fibers, and holographic optical elements.

As a non-limiting example, the illuminating device 111 may be a large (greater than 1.0 mm² emitting area) monochrome single-die LED with a center wavelength between 610 nm and 670 nm, such as the Luminus SST-90-R. As a further non-limiting example, the illuminator optics 113 may comprise at least one of an aspheric refractive lens element, a bi-convex or plano-convex spherical refractive lens element, or a mirror element. In this non-limiting example the illuminator optics 113 collectively project an image of the LED die on the surface of a rotatable shaft 190. Compared to alternatives (e.g. ring lights based on fiber optics, coboresighted illuminators based on beamsplitters, or laser-based illuminators), this illumination scheme is high-throughput, cost-effective, robust, eye-safe, and effective at highlighting trackable features (e.g., surface features) on the surface of the rotatable shaft 190.

Light reflected off the rotatable shaft 190 is collected by the imaging optics 121, which focus the image of the illuminated surface of the rotatable shaft 190 onto the image sensor 122, illustratively shown as being mounted on a circuit board 123. The imaging optics 121 may include one or more optical elements, including but not limited to lenses, prisms and mirrors. The image sensor 122 comprises one or more photonic components including but not limited to CMOS image sensors, CCD image sensors, and photodiodes or photodiode arrays.

As a non-limiting example, the image sensor 122 may be a monochrome CMOS image sensor with enhanced response in the spectral range of the illuminating device. For example the CMOS image sensor may be the ON Semi NOIP1FN0300A, which has a global shutter, enhanced quantum efficiency in the 610 nm to 670 nm band, and a maximum frame rate corresponding to more than 80 million pixels per second. As a further non-limiting example, the imaging optics 121 may comprise an off-the-shelf C-mount macro lens such as the Opto-Engineering MC3-03X. Furthermore, the optical path 124 of the image sensor 122 may nominally follow a radius of the rotatable shaft 190 at the point of impingement, with the pixel lines of the image sensor field of view nominally aligned with a direction of rotation of the rotatable shaft 190. That is, a CMOS image sensor, for example, includes a plurality of pixels spatially arranged adjacent to each other in lines and columns. "Pixel lines" refer to spatially adjacent pixels that are sequentially read out. By aligning the pixel lines nominally to the direction of rotation of the rotatable shaft 190, image readout from the image sensor 122 to the electronic control unit 130 may be increased, resulting in a higher frame rate. For a rotatable shaft 190 rotating at high speed, a high frame rate may be desirable to ensure that successive frames have some degree of overlap, i.e. that some surface features appear in both of any given pair of successive frames.

Additionally, an electronic control unit 130 is operably coupled to the image sensor 122 such that the electronic control unit 130 receives and stores image data comprising a plurality of image frames from the image sensor 122. The image data may be generated from all or some of the plurality of pixels in the pixel array of the image sensor 122. For example, in some embodiments, the image data received by the electronic control unit 130 is defined by less than the total number of the plurality of pixels of the pixel array. Compared to the maximum resolution of the image sensor, frames with a reduced number of pixels may be transmitted to the electronic control unit 130, so as to increase frame rate and reduce the computational expense of image processing.

The electronic control unit 130 uses signal processing algorithms to track shaft surface features across multiple image frames. Algorithms to track image features across multiple frames may include any known or yet-to-be developed image processing algorithms, including those employed for computer vision, image registration, or optical flow sensing. For example, image processing and/or feature recognition algorithms include, but are not limited to, scale-invariant feature transform (SIFT), cross-correlation techniques, and blob-detection algorithms.

The shaft surface feature tracking algorithms implemented by the electronic control unit 130 output transformations in image space (e.g. in terms of pixels) between pairs of frames containing shared or common portions of the rotatable shaft 190. As a non-limiting example, the transformations in image space may be translational offsets. Further examples of transformations include but are not limited to scalings and rotations, as well as nonlinear or non-rigid transformations such as radial basis functions.

The electronic control unit 130 then uses a quantitatively characterized relationship between image space and object space to calculate the relative difference in the position of the rotatable shaft 190 between pairs of frames based on the associated transformations in image space. For example, the quantitatively characterized relationship between image space (e.g., the image data generated by the image sensor) and object space may be defined by the one or more optics in the image sensor optical path 124 and characteristics of the image sensor 122. As a further non-limiting example, a known magnification of the imaging optics 121 and known pixel pitch (i.e. distance between adjacent pixels that is nominally uniform across the pixel array) of the image sensor 122 may be used to calculate a relative difference in the rotational position of the rotatable shaft 190 between two image frames based on a translational offset in surface features common to those two frames. The translational offset is defined by the transformation in image space between the one or more surface features that appear in the first frame (e.g., 310A, FIG. 4) of the image data and the same one or more surface features that appear in a second frame (e.g., 310B, FIG. 4) of the image data. The quantitatively characterized relationship between image space and object space may also include but is not limited to corrections for shaft curvature, optical aberrations, and/or keystone effect.

The calculated relative differences in the position of the rotatable shaft 190 between pairs of frames may be fused by the electronic control unit 130 across multiple pairs of frames to yield additional useful information. As a non-limiting example, the absolute rotational position of the rotatable shaft 190 may be assigned a value of zero for an arbitrary frame; the relative change in rotational position associated with each successive image frame as compared to the previous frame may then be added to the previous absolute rotational position so as to track absolute rotational position with respect to the assigned zero frame. As a further non-limiting example, the absolute rotational position of the rotatable shaft 190 in a given frame may be determined based wholly or in part on the position of the rotatable shaft in the given frame relative to a previously captured and stored frame associated with a known absolute shaft position.

The calculated relative differences in the position of the rotatable shaft 190 between pairs of frames may be fused by the electronic control unit 130 with temporal information about the image data to yield additional useful information. As a non-limiting example, a known frame rate of the image sensor 122 may be used to calculate a rotational speed of the rotatable shaft 190 based on the relative rotational position between two frames and the change in time between the same two frames. In other words, the rotational speed of a shaft may be determined by calculating the rotational distance that the rotatable shaft 190 travels and an elapsed amount of time for the rotatable shaft 190 to travel the rotational distance. For example, the rotational speed of the rotatable shaft 190 may be a function of the rotational distance that the rotatable shaft traverses between the rotational position of the rotatable shaft at the time of capture of a first frame of the image data and a rotational position of the rotatable shaft at the time of capture of a second frame of the image data and an elapsed amount of time between a time of capture of the first frame of image data and the time of capture of the second frame of image data.

The change in time may be determined based on a calculation of the passage of a number of frames from the first frame (e.g., 310A, FIG. 4) to the subsequent frame (e.g., 310B, FIG. 4) and a known frame rate of the image sensor 122. However, in some embodiments, the electronic control unit 130 may utilize a timer circuit or other method of determining the passage of time between image frames to obtain the change in time between the instantaneous rotational position and the subsequent rotational position.

As discussed herein above, the surface features used for determining a position the rotatable shaft 190 may be naturally occurring, incidentally created, or intentionally created. Furthermore, the instantaneous rotational position data may be output to a computing device 210 of a system 200 (FIG. 2) in real time, or stored in a memory component of the electronic control unit 130 and output on demand.

The electronic control unit 130 comprises one or more processing devices 131, including but not limited to microprocessor, microcontroller, central processing unit (CPU), graphics processing unit (GPU), field programmable gate array (FPGA), complex programmable logic device (CPLD), system on ship (SoC), and/or application-specific integrated circuit (ASIC) devices.

The electronic control unit 130 further comprises a non-transitory computer-readable memory 132 (e.g., a memory component) having machine-readable instructions implementing the functionalities of the electronic control unit 130 that are not otherwise implemented as digital and/or analog logic in the one or more processing devices 131.

Still referring to FIG. 1, folding optics 151 such as mirrors or prisms may be incorporated to steer the image sensor optical path 124 and/or the illuminator optical path 114 so as to package the non-contact sensor 100 in a more compact or otherwise desirable form factor. An enclosure 152, including an optically transparent window or windows 153 where the optical paths pass through the enclosure, may be incorporated to protect the functional components of the rotational position sensor from handling, dust, water and other potentially challenging aspects of the use environment.

Figure 2:
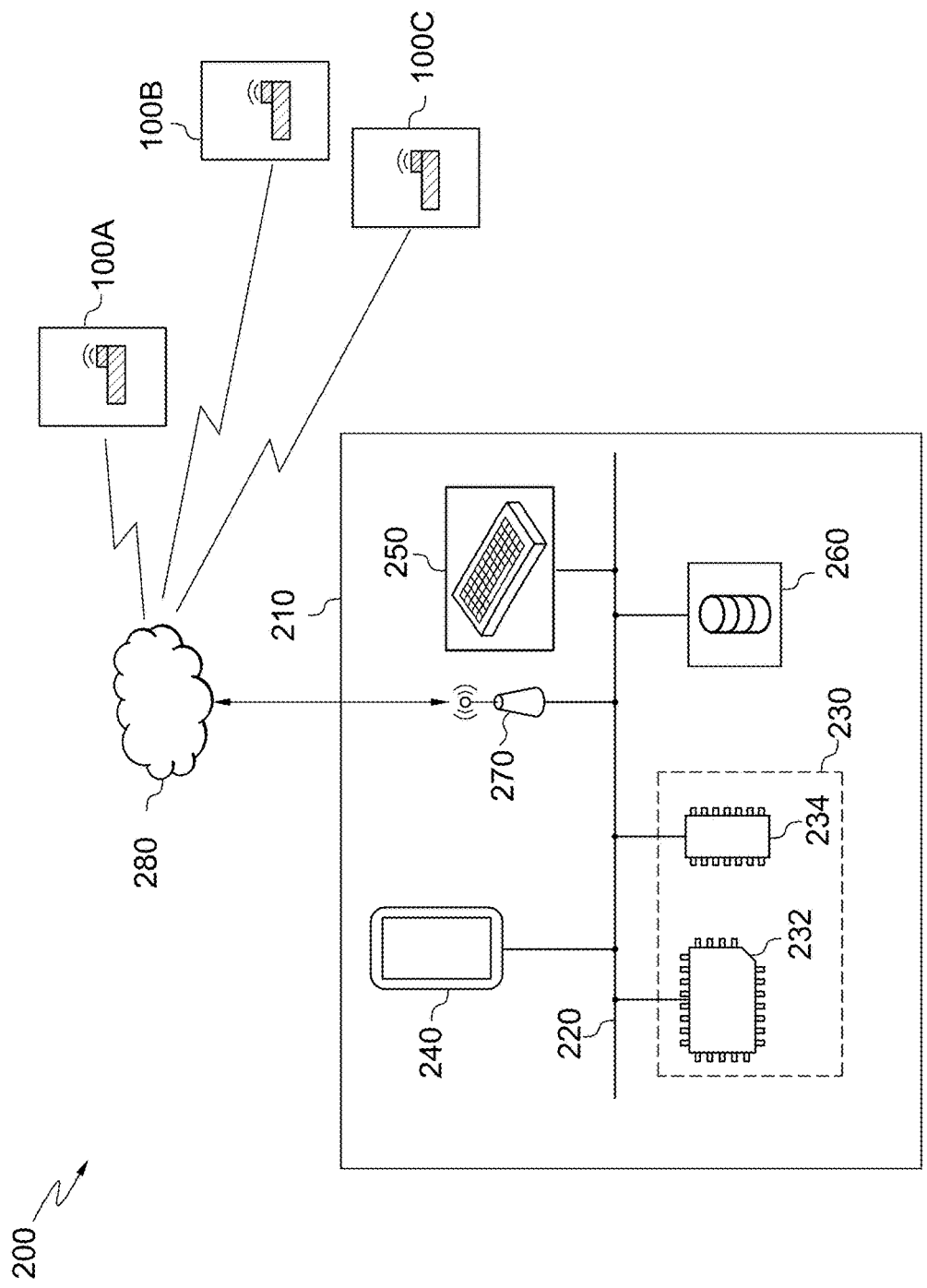
FIG. 2 depicts an illustrative system implementing a plurality of non-contact sensors for measuring rotational positions along a common rotatable shaft or along different rotatable shafts, according to one or more embodiments shown and described herein.

Turning to FIG. 2, an example system 200 implementing one or more non-contact sensors 100A, 100B, and 100C is depicted. The system 200 may be implemented within a vehicle, power generation facility, or other machinery or facility utilizing rotatable shafts that need to be monitored. For example, a vehicle may be an aircraft, an automobile, a ship, or the like. Power generation facilities may have generators or turbines that implement rotatable shafts where it may be critical to monitor their position, speed, torsional deflection and/or torque for operation of the power generation plant. As a further example, factories or other industrial facilities engaged in manufacturing, mining, or materials processing may likewise have a need to monitor rotatable shafts on rotating equipment. As yet a further example, in factories and laboratories wherein rotating machinery is manufactured, tested and/or otherwise used for experimentation, there may be a need to monitor a rotatable shaft constituting part or all of a device under test.

The system 200, as depicted, includes computing device 210 having a processing device 230 comprising a processor 232 and a non-transitory computer readable memory 234, a display 240, an input device 250, a data storage unit 260, and network interface hardware 270 such as a receiver, transmitter, or transceiver. These and other components of the system 200 may be communicatively connected to each other via a communication path 220. It should be understood that the system 200 may include all or some of the components depicted and described herein. As a non-limiting example, some systems 200 may merely include a computing device 210 configured to operate as and/or communicate with a supervisory controller such as a supervisory control and data acquisition (SCADA) system or engine control module (ECM), such that the computing device 210 does not include components such as a display 240, an input device 250, and/or a data storage unit 260. Furthermore, in other examples, operations of the computing device 210 may be implemented on one or more of the electronic control units 130 of one or more of the non-contact sensors 100A, 100B, or 100C such that processing, storage, communication, and control between a plurality of non-contact sensors 100A, 100B, and/or 100C is performed by the one or more of the electronic control units 130. Alternatively, the computing device 210 may be implemented to perform the functionality of one or more of the electronic control units 130 described herein.

The communication path 220 may be formed from any medium that is capable of transmitting a signal such as, for example, conductive wires, conductive traces, optical waveguides, or the like. The communication path 220 may also refer to the expanse in which electromagnetic radiation and their corresponding electromagnetic waves traverses. Moreover, the communication path 220 may be formed from a combination of mediums capable of transmitting signals. In one embodiment, the communication path 220 comprises a combination of conductive traces, conductive wires, connectors, and buses that cooperate to permit the transmission of electrical data signals to components such as processors, memories, sensors, input devices, output devices, and communication devices. Accordingly, the communication path 220 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. As used herein, the term "communicatively coupled" means that coupled components are capable of exchanging signals with one another such as, for example, electrical signals via conductive medium, electromagnetic signals via air, optical signals via optical waveguides, and the like.

The processing device 230 may be any device or combination of components comprising a processor 232 and non-transitory computer readable memory 234. The processor 232 may be any device capable of executing the machine-readable instruction set stored in the non-transitory computer readable memory 234. Accordingly, the processor 232 may be an electric controller, an integrated circuit, a microchip, a computer, or any other computing device. The processor 232 is communicatively coupled to the other components of the system 200 by the communication path 220. Accordingly, the communication path 220 may communicatively couple any number of processors 232 with one another, and allow the components coupled to the communication path 220 to operate in a distributed computing environment. Specifically, each of the components may operate as a node that may send and/or receive data. While the system 200 depicted in FIG. 2 includes a single processor 232, other embodiments may include more than one processor 232.

The non-transitory computer readable memory 234 may comprise RAM, ROM, flash memories, hard drives, or any non-transitory memory device capable of storing machine-readable instructions such that the machine-readable instructions can be accessed and executed by the processor 232. The machine-readable instruction set may comprise logic or algorithm(s) written in any programming language of any generation (e.g., 1GL, 2GL, 3GL, 4GL, or 5GL) such as, for example, machine language that may be directly executed by the processor 232, or assembly language, object-oriented programming (OOP), scripting languages, microcode, etc., that may be compiled or assembled into machine readable instructions and stored in the non-transitory computer readable memory 234. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 2 includes a single non-transitory computer readable memory 234, other embodiments may include more than one memory module.

Still referring to FIG. 2, the system 200 may include a display 240 for providing visual output such as, the rotational position, rotational speed, and/or the rotational torque of the rotatable shaft 190. The display 240 is coupled to the communication path 220. Accordingly, the communication path 220 communicatively couples the display 240 to other modules of the system 200. The display 240 may include any medium capable of transmitting an optical output such as, for example, a cathode ray tube, light emitting diodes, a liquid crystal display, a plasma display, or the like. Moreover, the display 240 may be a touchscreen that, in addition to providing optical information, detects the presence and location of a tactile input upon a surface of or adjacent to the display 240. Accordingly, each display 240 may receive a mechanical input directly upon the optical output provided by the display 240. Additionally, it is noted that the display 240 can include at least one of the one or more processors 232 and one or more non-transitory computer readable memory 234.

The system 200 may also include an input device 250 such as a keyboard, mouse, or other human interface device capable of conveying an input to the system 200. Additionally, the data storage component 260 is a memory component that is capable of maintaining data when powered off. The data storage component 260 may reside local to and/or remote from the computing device 210 and may be configured to store one or more pieces of data for access by the computing device 210 and/or other components. The data storage component 260 may store a calibration, image data, and/or calculated values such as rotational positions, rotational speed, and/or a torque of the rotatable shaft 190.

Still referring to FIG. 2, some systems rely on network interface hardware 270 to communicate with the one or more non-contact sensors 100A, 100B, and 100C. The network interface hardware 270 may be coupled to the communication path 220 and communicatively coupled to the processing device 230. The network interface hardware 270 may be any device capable of transmitting and/or receiving data with a network 280 or directly with the one or more non-contact sensors 100A, 100B, and 100C. Accordingly, network interface hardware 270 can include a communication transceiver for sending and/or receiving any wired or wireless communication. For example, the network interface hardware 270 may include an antenna, a modem, LAN port, Wi-Fi card, WiMax card, mobile communications hardware, near-field communication hardware, satellite communication hardware and/or any wired or wireless hardware for communicating with other networks and/or devices. In some embodiments, network interface hardware 270 includes hardware configured to operate in accordance with the Bluetooth wireless communication protocol. In another embodiment, network interface hardware 270 may include a Bluetooth send/receive module for sending and receiving Bluetooth communications to/from a network 280 and/or the one or more non-contact sensors 100A, 100B, and 100C. Furthermore, in some embodiments, the network interface hardware 270 may include hardware configured to implement a controller area network (CAN) bus thereby facilitating communication between computing devices 210, electronic control units 130, and/or components of the computing device 210 and the one or more non-contact sensors 100A, 100B, and 100C.

Figure 3:
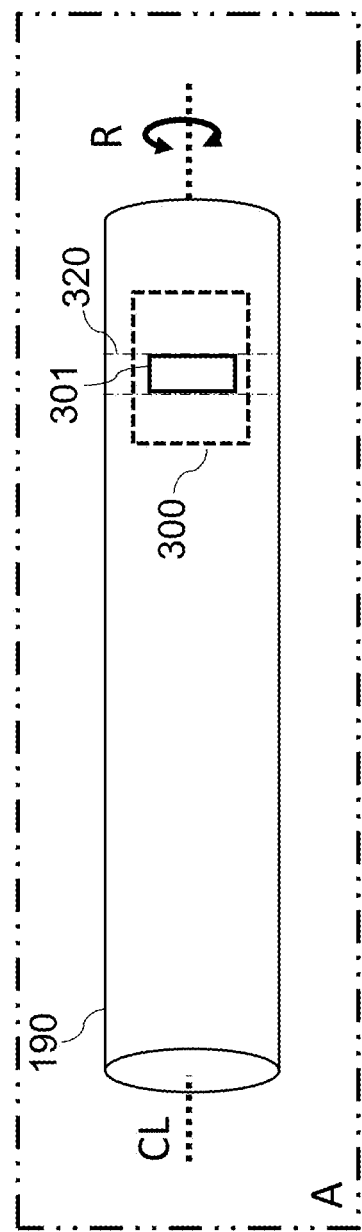
FIG. 3 depicts a illustrative planar view of the rotatable shaft along the surface illuminated and imaged by the non-contact sensor, according to one or more embodiments shown and described herein.

Referring to FIGS. 3-6, some illustrative embodiments relating to configurations and operations of the non-contact sensor 100 will now be described. In particular, FIG. 3 depicts a planar view of the rotatable shaft 190 along the surface illuminated and imaged by the non-contact sensor 100. Plane view A depicted in FIG. 3 corresponds to the view along line A-A depicted in FIG. 1.

As described herein, an illuminating device 111 may obliquely illuminate a portion 300 of the surface of the rotatable shaft 190. The illuminated portion 300 may be larger than an imaged portion 301. The imaged portion 301 is defined by the combination of imaging optics 121 and the image sensor 122. In some embodiments, the imaged portion 301 corresponds to a number of pixel lines L (FIG. 5) and pixel columns C (FIG. 5) of the pixel array of the image sensor 122. The number of pixel columns C may be greater than the number of pixel lines L that define the image data captured by the image sensor 122. Additionally, as the rotatable shaft 190 rotates (e.g., as indicated by arrow R), the image sensor 122 captures a sequence of image frames. The sequence of image frames is captured along a nominally circumferential portion 320 of the rotatable shaft 190.

Figure 4:
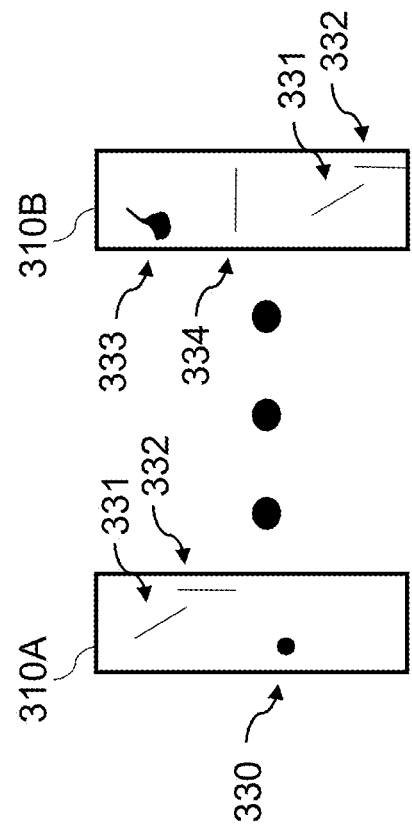
FIG. 4 depicts illustrative examples of a first and second image frame capturing surface features on the rotatable shaft at different rotational positions, according to one or more embodiments shown and described herein.

Referring to FIG. 4, an illustrative example of a first frame 310A and a second frame 310B, captured in succession by the image sensor 122 is depicted. Image data having image frames 310A and 310B correspond to the imaged portion 301 illustratively depicted in FIG. 3. As described herein, the electronic control unit 130 uses signal processing algorithms to track shaft surface features 330, 331, 332, 333, and/or 334 across multiple image frames (e.g., the first and second frames 310A and 310B) of the image data received from the image sensor 122. As depicted, merely for illustration, the first frame 310A is an image having surface features 330, 331, and 332. The second frame 310B, captured at some time after the first frame 310A is an image having surface features 331, 332, 333, and 334. As a non-limiting example, the first frame 310A and the second frame 310B may be captured in succession during less than a full revolution of the rotatable shaft 190. However, in some instances the first frame 310A and the second frame 310B may be captured over one or more full revolutions of the rotatable shaft 190.

As illustrated, surface features 331 and 332 are common to both the first frame 310A and the second frame 310B. When the electronic control unit 130 processes the image data (e.g., the first frame 310A and the second frame 310B), using a signal and/or image processing algorithm a transformation in image space can be determined. As described herein, the electronic control unit 130 is further configured to determine various operating characteristics of the rotatable shaft 190 such as a rotational position, a rotational speed, and/or a torsional deflection value based on the transformation and a quantitatively characterized relationship between image space and object space.

Figure 5:
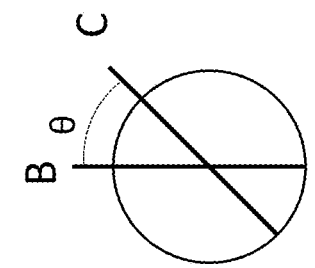
FIG. 5 depicts an illustrative example of an image sensor having a plurality of pixels arranged in a pixel array, according to one or more embodiments shown and described herein.
Figure 5:
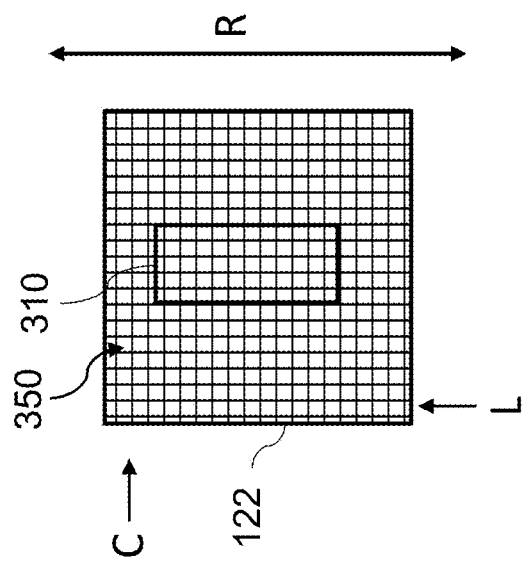

Turning to FIG. 5 an illustrative view of an image sensor 122 having a plurality of pixels 350. The plurality of pixels 350 are arranged in an array that may comprise a grid of pixel lines L and pixel columns C. As described herein, image sensor 122 may be configured to generate image data of the surface of the rotatable shaft 190 where the pixel lines are nominally aligned with the direction of rotation (e.g., as indicated by arrow R). Furthermore, in some instances the image sensor 122 may be configured such that the image frame 310 utilizes less than the total number of pixels 350 within the pixel array of the image sensor 122. The image sensor 122 may more rapidly read out image data when fewer pixels are utilized and/or when the pixel lines are nominally aligned with the direction of rotation of the rotatable shaft 190. That is, in some instances it may be advantageous to define an image frame 310 with an aspect ratio such that the number of pixels in the tangential dimension (nominally aligned with the direction of rotation R) exceeds the number of pixels in the axial dimension (nominally perpendicular to the direction of rotation R). In addition, many image sensors 122 are configured to complete the readout of data for each pixel in a pixel line L before starting to read out the pixels in a subsequent line, and further are configured such that the readout of each line of pixels is associated with some significant fixed overhead time. Accordingly, for such image sensors, defining the image frame 310 such that the number of columns C exceeds the number of lines L results in a faster frame rate compared to an otherwise equivalent image frame definition in which the number of columns C and lines L were transposed.

Figure 6:
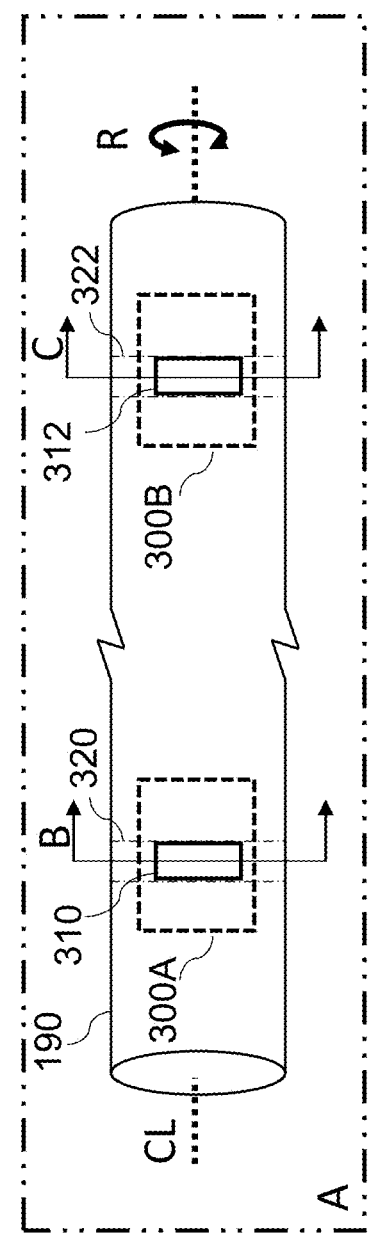
FIG. 6 depicts an illustrative planar view of the rotatable shaft being monitored at two distinct axially separated portions to measure rotational positions of the rotatable shaft and torque on the rotatable shaft, according to one or more embodiments shown and described herein.

Referring now to FIG. 6, an illustrative diagram of a rotatable shaft 190 analyzed by a system 200 having two non-contact sensors 100A and 100B (FIG. 2) configured to generate image data in the imaging fields 311 and 313, respectively. The two non-contact sensors 100A and 100B are positioned to analyze axially separated portions of the rotatable shaft 190 to determine a torsional deflection value of the rotatable shaft 190. That is, the system may determine the rotational position of the rotatable shaft at two locations along the length of the rotatable shaft and compare the rotational positions of each to determine whether there is an angular difference between the rotational positions.

For example, a first non-contact sensor having a first image sensor captures at least one image frame of the surface of the rotatable shaft 190 within an imaging field 311 about a first portion 320. A second non-contact sensor having a second image sensor captures at least one image frame of the surface of the rotatable shaft 190 within an imaging field 313 at a second portion 322 axially separated from the first portion 320. A first rotational position B of the rotatable shaft 190 at first portion 320 is determined based on a transformation in image space between one or more surface features that appear in a first frame of the image data (e.g. within imaging field 311) and the same one or more surface features that appear in a second frame of the image data (e.g. within imaging field 311) and a quantitatively characterized relationship between image space and object space. A second rotational position C of the rotatable shaft 190 at second portion 322 is determined based on a transformation in image space between one or more surface features that appear in a first frame of the image data (e.g. within imaging field 313) and the same one or more surface features that appear in a second frame of the image data (e.g. within imaging field 313) and a quantitatively characterized relationship between image space and object space. A difference between the first rotational position B and the second rotational position C is computed by the computing device 210 (FIG. 2) or an electronic control unit 130 of the non-contact sensor 100 (FIG. 1). The difference may be determined as an angular difference θ between the first rotational position B and the second rotational position C of the rotatable shaft 190 at the first portion 320 and the second portion 322, respectively. That is, the angular difference θ corresponds to a torsional deflection along the length of shaft between the two non-contact sensors.

When an angular difference θ is determined to be present (e.g., when a non-zero angular difference θ is calculated), the electronic control unit 130 may further determine a torque value corresponding to the calculated angular difference θ. For example, by using a quantitatively characterized relationship between torque and torsional deflection of the rotatable shaft 190, the instantaneous value of torque (i.e. torsional load) applied to the rotatable shaft may be determined.

It should be understood that embodiment of the present disclosure include non-contact sensor having an image sensor configured to capture image data of a portion of a surface of a rotatable shaft and an electronic control unit communicatively coupled to the image sensor. The electronic control unit is configured to receive image data from the image sensor and store the image data in a memory component of the electronic control unit. The image data includes a plurality of image frames. The electronic control unit is further configured to determine a transformation in image space between one or more surface features that appear in a first frame of the image data and the same one or more surface features that appear in a second frame of the image data, determine a rotational position of the rotatable shaft at a time of capture of the second frame of the image data based on the transformation and a quantitatively characterized relationship between image space and object space, and store the rotational position of the rotatable shaft at the time of capture of the second frame of the image data in the memory component of the electronic control unit.

In some implementations of the non-contact sensor can be used to determine a rotational speed of the rotatable shaft. For example, the electronic control unit is configured to calculate a rotational speed of the rotatable shaft based on a rotational distance the rotatable shaft traverses between the rotational position of the rotatable shaft at the time of capture of the first frame of the image data and a rotational position of the rotatable shaft at the time of capture of the second frame of the image data and an elapsed amount of time between the time of capture of the first frame of the image data and the time of capture of the second frame of the image data, and store the rotational speed in the memory component of the electronic control unit.

It is further understood that a plurality of non-contact sensors can be communicatively coupled to each other and/or a computing device. As a non-limiting example, a non-contact sensor system includes a first non-contact sensor and a second non-contact sensor communicatively coupled to a computing device. The first non-contact sensor includes a first image sensor configured to capture image data of a first portion of a surface of a rotatable shaft and the second non-contact sensor comprises a second image sensor configured to capture image data of a second portion of a surface of the rotatable shaft, wherein the first portion and the second portion are axially separated along the rotatable shaft. The computing device is configured to receive a first image data from the first image sensor and a second image data from the second image sensor. The first and second image data each include a plurality of image frames. The computing device is further configured to determine a first transformation in image space between one or more surface features that appear in a first frame of the first image data and the same one or more surface features that appear in a second frame of the first image data, determine a first rotational position of the rotatable shaft at a time of capture of the second frame of the first image data based on the first transformation and a first quantitatively characterized relationship between image space of the first image sensor and object space, determine a second transformation in image space between one or more surface features that appear in a first frame of the second image data and the same one or more surface features that appear in a second frame of the second image data, determine a second rotational position of the rotatable shaft at a time of capture of the second frame of the second image data based on the second transformation and a second quantitatively characterized relationship between image space of the first image sensor and object space, calculate an angular difference between the first rotational position and the second rotational position of the rotatable shaft, thereby determining a torsional deflection of the rotatable shaft between the first portion and the second portion of the rotatable shaft, and store the torsional deflection of the rotatable shaft in a memory component of the computing device.

Unless otherwise defined, all technical and scientific terms used herein have the same meaning as commonly understood by one of ordinary skill in the art to which the invention belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A non-contact sensor comprising:
   an image sensor configured to capture image data of a portion of a circumferential surface of a rotatable shaft;
   an illuminating device configured to obliquely illuminate the circumferential surface of the rotatable shaft, wherein the image sensor is configured to capture image data from a portion of the illuminated circumferential surface of the rotatable shaft, wherein the image sensor comprises a pixel array comprising a predefined number of pixel lines and columns, whereby each pixel in a pixel line is read out before a pixel in a subsequent pixel line, and the pixel lines of the image sensor are nominally aligned with a direction of rotation of the rotatable shaft such that an imaging frame rate is faster compared to other orientations of the image sensor; and
   an electronic control unit communicatively coupled to the image sensor, the electronic control unit configured to:
      receive image data from the image sensor and store the image data in a memory component of the electronic control unit, the image data comprising a plurality of image frames,
      determine a transformation in image space between one or more surface features that appear in a first frame of the image data and the same one or more surface features that appear in a second frame of the image data,
      determine a rotational position of the rotatable shaft at a time of capture of the second frame of the image data based on the transformation and a quantitatively characterized relationship between image space and object space, and
      store the rotational position of the rotatable shaft at the time of capture of the second frame of the image data in the memory component of the electronic control unit.

2. The non-contact sensor of claim 1, wherein the second frame of the image data is captured during a revolution of the rotatable shaft subsequent to the revolution during which the first frame of the image data is captured.

3. The non-contact sensor of claim 1, wherein an angle of incidence of an optical path of light emitted from the illuminating device impinging the circumferential surface of the rotatable shaft is between 35 degrees and 55 degrees relative to a plane tangent to the circumferential surface of the rotatable shaft at a point of impingement.

4. The non-contact sensor of claim 1, wherein the illuminating device is an LED comprising an emitting area greater than 1.0 mm$^2$.

5. The non-contact sensor of claim 1, wherein the illuminating device emits light with a center wavelength between about 610 nm and about 670 nm.

6. The non-contact sensor of claim 1, wherein the illuminating device obliquely illuminates the circumferential surface of the rotatable shaft via one or more optical elements forming an optical path for light emitted from the illuminating device to the circumferential surface of the rotatable shaft, wherein the one or more optical elements comprise at least one of an aspheric refractive lens element, a bi-convex or plano-convex spherical refractive lens element, or a mirror element.

7. The non-contact sensor of claim 1, wherein the electronic control unit is further configured to:
   calculate a rotational speed of the rotatable shaft based on a rotational distance the rotatable shaft traverses between the rotational position of the rotatable shaft at the time of capture of the first frame of the image data and a rotational position of the rotatable shaft at the time of capture of the second frame of the image data and an elapsed amount of time between the time of capture of the first frame of the image data and the time of capture of the second frame of the image data, and
   store the rotational speed in the memory component of the electronic control unit.

8. The non-contact sensor of claim 7, wherein the elapsed amount of time is determined based on a number of frames from the first frame to the second frame and a frame rate of the image sensor.

9. The non-contact sensor of claim 1, wherein the image sensor is a monochrome CMOS image sensor.

10. The non-contact sensor of claim 1, wherein the image sensor is a monochrome CMOS image sensor with enhanced response in the red to near infrared spectral range.

11. The non-contact sensor of claim 1, wherein an optical path of the image sensor nominally follows the circumferential surface of the rotatable shaft at a point of impingement on the circumferential surface of the rotatable shaft.

12. The non-contact sensor of claim 1, wherein the pixel array of the image sensor comprises a plurality of pixels and the image data received by the electronic control unit is defined by less than a total number of the plurality of pixels of the pixel array.

13. A method comprising:
receiving image data from an image sensor and storing the image data in a memory component of an electronic control unit, the image data comprising a plurality of image frames each of a portion of a circumferential surface of a rotatable shaft obliquely illuminated by an illuminating device, wherein the image sensor comprises a pixel array comprising a predefined number of pixel lines and columns, whereby each pixel in a pixel line is read out before a pixel in a subsequent pixel line, and the pixel lines of the image sensor are nominally aligned with a direction of rotation of the rotatable shaft such that an imaging frame rate is faster compared to other orientations of the image sensor;
determining a transformation in image space between one or more surface features that appear in a first frame of the image data and the same one or more surface features that appear in a second frame of the image data;
determining a rotational position of the rotatable shaft at a time of capture of the second frame of the image data based on the transformation and a quantitatively characterized relationship between image space and object space; and
storing the rotational position of the rotatable shaft at the time of capture of the second frame of the image data in the memory component of the electronic control unit.

14. The method of claim 13, further comprising:
calculating a rotational speed of the rotatable shaft based on a rotational distance the rotatable shaft traverses between the rotational position of the rotatable shaft at the time of capture of the first frame of the image data and a rotational position of the rotatable shaft at the time of capture of the second frame of the image data and an elapsed amount of time between a time of capture of the first frame of the image data and the time of capture of the second frame of the image data; and
storing the rotational speed in the memory component of the electronic control unit.

15. The method of claim 14, wherein the elapsed amount of time is determined based on a number of frames from the first frame to the second frame and a frame rate of the image sensor.

16. The method of claim 13, wherein the image sensor is a monochrome CMOS image sensor.

17. The method of claim 13, wherein the image sensor is a monochrome CMOS image sensor with enhanced response in the red to near infrared spectral range.

18. A system comprising:
a first non-contact sensor and a second non-contact sensor communicatively coupled to a computing device, wherein:
the first non-contact sensor comprises:
a first image sensor configured to capture image data of a first portion of a circumferential surface of a rotatable shaft, and
a first illuminating device configured to obliquely illuminate the first portion of the circumferential surface of the rotatable shaft, wherein the first image sensor is configured to capture image data from a portion of the illuminated circumferential surface of the rotatable shaft, wherein the first image sensor comprises a pixel array comprising a predefined number of pixel lines and columns, whereby each pixel in a pixel line is read out before a pixel in a subsequent pixel line, and the pixel lines of the first image sensor are nominally aligned with a direction of rotation of the rotatable shaft such that an imaging frame rate is faster compared to other orientations of the first image sensor;
the second non-contact sensor comprises:
a second image sensor configured to capture image data of a second portion of the circumferential surface of the rotatable shaft, wherein the first portion and the second portion are axially separated along the rotatable shaft, and
an illuminating device configured to obliquely illuminate the second portion of the circumferential surface of the rotatable shaft, wherein the second image sensor is configured to capture image data from a portion of the illuminated circumferential surface of the rotatable shaft; and
the computing device is configured to:
receive a first image data from the first image sensor and a second image data from the second image sensor, the first and second image data each comprising a plurality of image frames,
determine a first transformation in image space between one or more surface features that appear in a first frame of the first image data and the same one or more surface features that appear in a second frame of the first image data,
determine a first rotational position of the rotatable shaft at a time of capture of the second frame of the first image data based on the first transformation and a first quantitatively characterized relationship between image space of the first image sensor and object space,
determine a second transformation in image space between one or more surface features that appear in a first frame of the second image data and the same one or more surface features that appear in a second frame of the second image data,
determine a second rotational position of the rotatable shaft at a time of capture of the second frame of the second image data based on the second transformation and a second quantitatively characterized relationship between image space of the second image sensor and object space,
calculate an angular difference between the first rotational position and the second rotational position of the rotatable shaft, thereby determining a torsional deflection of the rotatable shaft between the first portion and the second portion of the rotatable shaft, and
store the torsional deflection of the rotatable shaft in a memory component of the computing device.

* * * * *